(12) United States Patent
Ito et al.

(10) Patent No.: US 11,588,172 B2
(45) Date of Patent: Feb. 21, 2023

(54) ALL-SOLID-STATE BATTERY

(71) Applicant: TAIYO YUDEN CO., LTD., Tokyo (JP)

(72) Inventors: Daigo Ito, Takasaki (JP); Takeyuki Fukushima, Takasaki (JP); Hidenori Somei, Takasaki (JP); Yoichiro Ogata, Takasaki (JP); Chie Kawamura, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 21 days.

(21) Appl. No.: 15/792,737

(22) Filed: Oct. 24, 2017

(65) Prior Publication Data

US 2018/0115016 A1    Apr. 26, 2018

(30) Foreign Application Priority Data

Oct. 26, 2016  (JP) .............................. JP2016-209947

(51) Int. Cl.
| | |
|---|---|
| *H01M 10/0525* | (2010.01) |
| *H01M 4/525* | (2010.01) |
| *H01M 4/58* | (2010.01) |
| *H01M 10/052* | (2010.01) |
| *H01M 10/0562* | (2010.01) |

(Continued)

(52) U.S. Cl.
CPC ....... *H01M 10/0525* (2013.01); *H01M 4/525* (2013.01); *H01M 4/5825* (2013.01); *H01M 10/052* (2013.01); *H01M 10/0562* (2013.01); *G01N 23/20075* (2013.01); *H01M 2004/027* (2013.01); *H01M 2004/028* (2013.01); *H01M 2300/0068* (2013.01); *H01M 2300/0088* (2013.01)

(58) Field of Classification Search
CPC .............. H01M 10/0525; H01M 4/525; G01N 23/20075
See application file for complete search history.

(56) References Cited

U.S. PATENT DOCUMENTS

| 9,865,899 B2 * | 1/2018 | Ito ..................... H01M 10/0562 |
| 2005/0019666 A1 * | 1/2005 | Yasuda ................. H01M 6/187 429/309 |

(Continued)

FOREIGN PATENT DOCUMENTS

| JP | 2001185148 A | 7/2001 | |
| JP | 2015195180 A | 11/2015 | |
| WO | WO-2014208133 A1 * | 12/2014 | ........ H01M 10/0562 |

*Primary Examiner* — Stewart A Fraser
*Assistant Examiner* — Brent C Thomas
(74) *Attorney, Agent, or Firm* — Law Office of Katsuhiro Arai (57) ABSTRACT

An all-solid-state battery includes a pair of electrode layers consisting of first and second electrode layers, and a solid-state electrolyte layer positioned between the pair of electrode layers, wherein the first electrode layer contains an electrode active material having an olivine-type crystalline structure, the solid-state electrolyte layer contains a solid-state electrolyte having a NASICON-type crystalline structure, and the solid-state electrolyte layer in the vicinity of the first electrode layer is expressed by a composition formula $Li_xA_yCo_zM'_aM''_bP_3O_c$. The all-solid-state battery can improve the long-term cycle stability.

19 Claims, 4 Drawing Sheets (51) Int. Cl.
  *G01N 23/20* (2018.01)
  *H01M 4/02* (2006.01)

(56) References Cited

U.S. PATENT DOCUMENTS

| | | | | |
|---|---|---|---|---|
| 2012/0171549 A1* | 7/2012 | Ouchi | ................ | H01M 2/1646 |
| | | | | 429/152 |
| 2014/0080006 A1* | 3/2014 | Ogasa | ................... | H01M 4/485 |
| | | | | 429/319 |
| 2014/0154586 A1* | 6/2014 | Hayashi | ............ | H01M 10/4235 |
| | | | | 429/322 |
| 2014/0342230 A1* | 11/2014 | Watanabe | ............. | H01M 4/505 |
| | | | | 429/223 |
| 2015/0333366 A1* | 11/2015 | Sato | ...................... | H01M 4/136 |
| | | | | 429/319 |
| 2016/0141716 A1* | 5/2016 | Ito | ..................... | H01M 10/0562 |

\* cited by examiner

ALL-SOLID-STATE BATTERY

BACKGROUND

Field of the Invention

The present invention relates to an all-solid-state battery containing solid-state electrolyte.

Description of the Related Art

The development of large-capacity electrochemical devices such as lithium-ion secondary batteries and electrical double-layer capacitors has been active in recent years, and these devices are finding their way into consumer equipment, industrial machinery, automobiles, and various other industries. Secondary batteries using electrolytes present problems such as leakage of electrolyte. Accordingly, development of all-solid-state batteries of which components are all in solid state, based on use of solid-state electrolyte, is gaining momentum. An all-solid-state battery is generally constituted by a positive-electrode collector, a positive-electrode layer, a solid-state electrolyte layer, a negative-electrode layer, and a negative-electrode collector, arranged in this order.

Application, to an all-solid-state lithium-ion secondary battery, of a positive-electrode active material that operates at high potential, is being proposed to improve energy density. Disclosed in Patent Literature 1 is a Spinel-type $LiNi_{0.5}Mn_{1.5}O_4$, which is a positive-electrode active material operating at high potential. This prior art merely represents an example of using a liquid electrolyte; however, it is shown that, according to the aforementioned positive-electrode active material, a potential plateau at nearly 5 V manifests. Energy density can be improved by using the aforementioned positive-electrode active material, compared to any traditional 4-V-level active material. However, it is reportedly difficult, with batteries to which 5-V-level active material is applied, to achieve good cycle characteristics in general. This is because repeated charging and discharging under 5 V of voltage causes the electrolyte present between the two electrodes to gradually undergo a decomposition reaction (secondary reaction). The foregoing depends on the voltage stability of the organic solvent constituting the electrolyte. Disclosed in Patent Literature 2 is an electrolyte constituted by an organic solvent having high voltage stability. Such electrolyte has a wide potential window, can withstand a wide range of voltage, and is therefore resistant to cycle deterioration even when a positive-electrode active material of 5-V level is used.

BACKGROUND ART LITERATURES

[Patent Literature 1] Japanese Patent Laid-open No. 2001-185148
[Patent Literature 2] Japanese Patent Laid-open No. 2015-195180

SUMMARY

In the field of all-solid-state batteries, also, the width of the potential window of the solid-state electrolyte present between the electrodes and also in the electrode layers, is considered an important factor of the cycle characteristics when a 5-V-level positive-electrode active material is to be applied. The inventors of the present invention found that, if an active material that operates at high potential, such as $LiCoPO_4$, is applied as the positive-electrode active material for an all-solid-state battery, the electrolyte in contact with the positive-electrode side would undergo an undesirable electrochemical reaction (secondary reaction), as is the case with a solution based battery. With an all-solid-state battery combining a solid-state electrolyte having a NASICON-type crystalline structure with $LiCoPO_4$, the potential at which $LiCoPO_4$ is fully charged is near 5 V, and therefore the NASICON-type solid-state electrolyte must have a wide potential window. When a voltage near 5 V relative to the reference potential of lithium is applied to the solid-state electrolyte, a secondary reaction may occur where Li in the solid-state electrolyte is extracted and migrates toward the negative-electrode side. Such secondary reaction can lead to a drop in coulomb efficiency due to charging/discharging or a drop in ion conductivity due to gradual extraction of Li and eventually an increase in internal resistance. There are concerns that the foregoing may result in a capacity drop or cycle deterioration due to charge/discharge cycles. In particular, such secondary reaction is likely to occur when a solid-state electrolyte to which Co has been added is applied in order to achieve co-sintering with $LiCoPO_4$.

In light of the above, the present invention aims to improve the long-term cycle stability of an all-solid-state battery.

Any discussion of problems and solutions involved in the related art has been included in this disclosure solely for the purposes of providing a context for the present invention, and should not be taken as an admission that any or all of the discussion were known at the time the invention was made.

The all-solid-state battery proposed by the present invention comprises a pair of electrode layers consisting of first and second electrode layers, and a solid-state electrolyte layer positioned between the pair of electrode layers. The first electrode layer contains an electrode active material having an olivine-type crystalline structure. The solid-state electrolyte layer contains a solid-state electrolyte having a NASICON-type crystalline structure. The solid-state electrolyte layer in the vicinity of the first electrode layer is expressed by the composition $Li_xA_yCo_zM'_aM''_bP_3O_c$. x, y, z, a, b, c, A, M' and M'' are described later.

According to the present invention, the reaction of lithium extraction from the solid-state electrolyte during charging is suppressed, and consequently an all-solid-state battery subject to little capacity drop due to charge/discharge cycles or, in other words, an all-solid-state battery with high long-term cycle stability can be obtained.

For purposes of summarizing aspects of the invention and the advantages achieved over the related art, certain objects and advantages of the invention are described in this disclosure. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of this invention will become apparent from the detailed description which follows.

BRIEF DESCRIPTION OF THE DRAWINGS

These and other features of this invention will now be described with reference to the drawings of preferred embodiments which are intended to illustrate and not to limit the invention. The drawings are greatly simplified for illustrative purposes and are not necessarily to scale.

DESCRIPTION OF THE SYMBOLS

1a/2a Current collector
1b/2b Electrode layer
3 Electrolyte layer
10a Current collector precursor
10b Electrode layer precursor
31 to 35 Electrolyte layer precursor

DETAILED DESCRIPTION OF EMBODIMENTS

The present invention is described in detail by referring to the drawings as deemed appropriate. However, the present invention is not limited to the embodiments shown in these drawings. Also, it should be noted that characteristic parts of the invention may be emphasized in the drawings, and therefore the scale of each part of the drawings is not always accurate.

Figure 1:
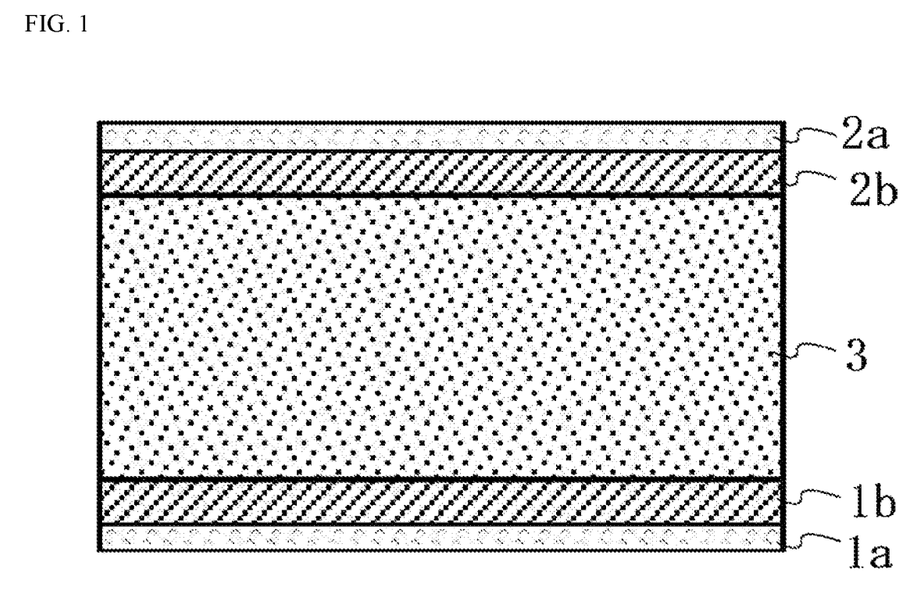
FIG. 1 is a schematic cross-sectional view of an all-solid-state battery conforming to the present invention.

FIG. 1 is a schematic cross-sectional view of an example of an all-solid-state battery pertaining to the present invention. The all-solid-state battery has a basic structure of a pair of electrode layers 1b and 2b sandwiching a solid-state electrolyte layer 3. Both electrode layers 1b and 2b have current collectors 1a and 2a for electron transfer. In general, one of the pair of electrode layers acts as a positive electrode, while the other acts as a negative electrode, based on a difference in electrode potential, etc. For the sake of convenience, the electrode layer 1b is hereinafter referred to as a "first electrode layer," while the electrode layer 2b is hereinafter referred to as a "second electrode layer." According to the below-mentioned constitution of the electrode layers, it is normally assumed that the first electrode layer 1b is used as a positive-electrode layer.

According to the present invention, the solid-state electrolyte layer 3 in the vicinity of the first electrode layer 1b is expressed by a specific composition formula. "The vicinity of the first electrode layer" indicates an area within 5 μm from the interface between the solid-state electrolyte layer 3 and the first electrode layer 1b. It should be noted that, if the thickness of the solid-state electrolyte layer 3 is 5 μm or less, then it is considered that the entire area of the solid-state electrolyte layer 3 is in "the vicinity of the first electrode layer."

The solid-state electrolyte layer 3 is expressed by the composition $Li_xA_yCo_zM'_aM''_bP_3O_c$ in "the vicinity of the first electrode layer 1b" based on the aforementioned meaning. In this composition formula, the composition ratios of other elements are expressed by the parameters x, y, z, a, b, and c, with reference to the composition ratio of P being 3.

Element A is at least one bivalent metal element selected from the group that includes Mg, Ca, and Ni and is preferably Mg. Since Mg has a small atomic radius, its valence is expected to be stable.

Element M' is at least one trivalent metal element selected from the group that includes Al, Y, and Ga.

Element M" is at least one tetravalent transition metal element selected from the group that includes Ti, Ge, and Zr.

x is between 1.0 and 2.0.

y is between 0 and 0.4. If y is 0, it means element A as described later is not contained.

z is between 0.05 and 0.8.

a is between 0.2 and 0.7.

b is between 1.3 and 1.7.

c is between 12.0 and 13.5.

Furthermore, "9−3a−4b≤x+2y+2z" must be satisfied.

The left term represents a valence calculation formula whereby "3a" considering the ratio a of trivalent element M' and "4b" considering the ratio b of tetravalent element M" are subtracted from the valence "9" of $(PO_4^{3-})_3$.

The right term gives a sum of "x" being the ratio of monovalent Li, "2y" considering the ratio y of bivalent element A, and "2z" considering the ratio z of element Co which is also bivalent.

When the calculated value of the right term is equal to or greater than the calculated value of the left term, it means, chemically, that the possibility of Li or the bivalent element occupying an empty Li site is higher, and consequently there is less extraction of Li from the solid-state electrolyte even when the potential is high enough for $LiCoPO_4$ to operate, and if Li is extracted, there should be less drop in ion conductivity because the skeleton does not collapse easily.

Furthermore, the right term (x+2y+2z) in the aforementioned inequality expression is between 1.8 and 2.8. This means, chemically, that the possibility of Li or the bivalent element occupying an empty Li site is higher, and that the NASICON structure is also stable. If this value is too large, a lot of secondary phases as descried below manifest, which is not desirable. If this value is too small, on the other hand, the effect of the present invention to suppress lithium extraction can decrease.

The fact that the solid-state electrolyte layer 3 has the aforementioned composition in "the vicinity of the first electrode layer" can be determined by sampling the solid-state electrolyte layer in the applicable area and analyzing the sample with an element analysis as deemed appropriate. Specific means for such element analysis include SEM-EDS analysis, Auger spectroscopy, equivalent thereto, and the like.

The aforementioned composition formula may represent a non-stoichiometric composition. Accordingly, there are cases where primary and secondary phases may appear in the vicinity of the first electrode layer, instead of a single phase, and these cases are also included in the scope of the present invention so long as the aforementioned composition formula is satisfied in the vicinity of the first electrode layer as a whole. The primary phase has a NASICON-type crystalline structure, while each secondary phase exhibits a crystalline structure different from that of the primary phase.

Now, favorable content ratios of the primary and secondary phases are explained. The content ratio of the primary and secondary phases is expressed by a ratio of X-ray diffraction peak intensities. $I_{main}$ represents the main diffraction peak intensity of the primary phase. $I_{sub}$ indicates the total sum of the main diffraction peak intensities of the respective secondary phases. Here, $I_{sub}/(I_{main}+I_{sub})$ is preferably 2 to 40%. Too high a ratio of secondary phases raises concerns that the ion conductivity may drop, or specifically the internal resistance may increase; hence, the aforementioned range is presented.

Each secondary phase may contain segregated particles, and if segregated particles are contained, their largest particle diameter is preferably 5 μm or less. If segregation particles are 5 μm or less, any problem such as drop in ion conductivity or deterioration of sintering property is minimal. Preferably a secondary phase is at least one type selected from the group that includes $GeO_2$, $AlPO_4$, and $LiCoPO_4$. When they are contained as secondary phases, the sintering temperature decreases, and ion conductivity manifests more easily compared to the composition without them.

According to a favorable embodiment, the solid-state electrolyte layer 3 is expressed by the aforementioned composition formula not only in the vicinity of the first electrode layer 1b, but also in the vicinity of the second electrode layer 2b. Here, the meaning of each symbol in the composition formula is the same as described above. For the meaning of "the vicinity" of the second electrode layer, the aforementioned interpretation pertaining to "the vicinity of the first electrode layer" can be applied accordingly.

Each symbol in the aforementioned composition formula presents room for element selection and value selection. Once the aforementioned condition is met, different elements or values may be selected for the vicinity of the first electrode layer and the vicinity of the second electrode layer. Preferably the same composition applies to the constitution in the vicinity of the first electrode layer and that in the vicinity of the second electrode layer.

Of the solid-state electrolyte layer 3, areas other than the vicinity of the first electrode layer only need to be constituted by a substance which is solid at room temperature. Any known material may be used for the solid-state electrolyte layer as deemed appropriate, but preferable examples include lithium-containing phosphates having a NASICON structure. These phosphates are known materials for solid-state electrolyte, and any such phosphate may be used accordingly without any limitation. Typical examples include Ti-complexed lithium phosphates, or the like, where Ti may be substituted partially or entirely by Ge, Sn, Hf, Zr, or other tetravalent transition metal. Also, Ti may be partially substituted by Al, Ga, In, Y, La, or other trivalent transition metal in order to increase the Li content. More specific examples of lithium-containing phosphates having a NASICON structure include, but are not limited to, Li—Al—Ge—$PO_4$ materials, $LiTi_2(PO_4)_3$, or the like. Among these, Li—Al—Ge—$PO_4$ materials to which the same transition metal as the one contained in the phosphate having an olivine-type crystalline structure, which in turn is contained in both electrodes 1b and 2b, has been added, are preferred. If a phosphate containing Co and Li is contained in both electrodes 1b and 2b, for example, preferably a Li—Al—Ge—$PO_4$ material to which Co has been added, is contained in the solid-state electrolyte layer. This is expected to prevent elution of the transition metal contained in the electrode active material into the electrolyte.

The method for forming the solid-state electrolyte layer is not limited in any way, and any prior art may be referenced as deemed appropriate. For example, any of the aforementioned phosphate materials is prepared to have an appropriate particle size distribution and uniformly dispersed in a water-based solvent or organic solvent together with binder, dispersant, plasticizer, etc., to obtain a slurry. Here, a bead mill, wet jet mill, any of the various types of kneaders, or high-pressure homogenizer, etc., may be used; among them, however, preferably a bead mill is used because the adjustment of particle size distribution and dispersion can be performed simultaneously. The obtained slurry can be coated to obtain a green sheet of desired thickness. The coating method is not limited in any way, and any prior art may be referenced as deemed appropriate, where examples include, but are not limited to, the slot die method, reverse coating method, gravure coating method, bar coating method, doctor blade method, etc.

Next, the electrode layers are explained.

Under the present invention, at least the first electrode layer 1b or preferably both electrode layers 1b and 2b, contain a substance having an olivine-type crystalline structure as an electrode active material. Examples of such electrode active material include phosphates containing transition metal and lithium. Traditionally, these phosphates have often been used as a positive-electrode active material. The olivine-type crystalline structure represents crystal contained in natural olivine and can be discriminated by means of X-ray diffraction.

A typical example of an electrode active material having an olivine-type crystalline structure is Co-containing $LiCoPO_4$. In the aforementioned chemical formula, a phosphate of which transition metal Co has been substituted may also be used. Here, the ratio of Li or $PO_4$ may vary depending on the valence. Preferred transition metals include Co, Mn, Fe, and Ni, among others.

As before, an electrode active material having an olivine-type crystalline structure acts as a positive-electrode active material in an electrode layer that acts as a positive electrode. If an electrode active material having an olivine-type crystalline structure is contained only in the first electrode layer 1b, for example, preferably this electrode active material acts as a positive-electrode active material. When an electrode active material having an olivine-type crystalline structure is also contained in the second electrode layer 2b, the mechanism of how it would act in an electrode layer that acts as a negative-electrode is not completely clear; however, such effects as an increase in discharge capacity, as well as a rise in operating potential in accordance with discharge, which are presumably based on local formation of solid-solution state with the negative-electrode active material, are demonstrated.

When both electrode layers 1b and 2b contain an electrode active material having an olivine-type crystalline structure, preferably each electrode active material contains a transition metal which may be the same or different. By "may be the same or different," it means that the electrode active material contained in the electrode layer 1b and that contained in the electrode layer 2b may each contain a transition metal of the same type or may each contain a transition metal of a different type. The electrode layers 1b and 2b may each contain only one type of transition metal or may each contain two or more types of transition metals. Preferably both electrode layers 1b and 2b contain a transition metal or metals of the same type(s). More preferably both electrode layers contain an electrode active material of the same chemical composition. If both electrode layers 1b and 2b contain a transition metal or metals of the same type(s) or contain an electrode active material of the same composition, the composition similarity of both electrode layers increases, and this achieves an effect that, in some applications, the all-solid-state battery proposed by the present invention can withstand actual use without malfunctioning even if inadvertently installed in reverse polarities.

One of the pair of electrode layers 1b and 2b may further contain any known substance as a negative-electrode active material. If a negative-electrode active material is contained in only one electrode layer, it becomes clear that this one electrode layer acts as a negative electrode, while the other electrode layer acts as a positive electrode. When a negative-electrode active material is contained in only one electrode layer, preferably this one electrode layer is the second electrode layer 2b. It should be noted that both electrode layers may contain any known substance as a negative-electrode active material. Regarding negative-electrode active materials for electrodes, any prior art relating to secondary batteries may be referenced as deemed appropriate, where examples include titanium oxides, lithium titanium complex oxides, carbons, vanadium lithium phosphates, and other compounds.

In manufacturing the pair of electrode layers 1b and 2b, any solid-state electrolyte material, carbon, metal, or other conductive material (conductive auxiliary) may be used further in addition to the aforementioned active materials. Any such material can be uniformly dispersed in water or organic solvent, together with binder and plasticizer, to obtain a paste for electrode layers. The metal in the conductive auxiliary may be Pd, Ni, Cu, Fe, alloy thereof, etc.

When a solid-state electrolyte material is added further to the electrode layers 1b and 2b, preferably the solid-state electrolyte material to be added can be expressed by the aforementioned composition formula $Li_xA_yCo_zM'_aM''_bP_3O_c$. Here, x, y, z, a, b, c, A, M', and M'' are the same as described above.

Examples of conductive metals used for the current collectors connected to both electrode layers 1b and 2b, respectively, include, but are not limited to, Ni, Cu, Pd, Ag, Pt, Au, Al, Fe, and other single metals, as well as alloys and oxides thereof. The aforementioned paste for electrode layers and a conductive metal paste for current collectors may be used; for example, the paste for electrode layers may be printed on a green sheet for solid-state electrolyte layers as described later, after which the conductive metal paste may be printed on top. The printing method is not limited in any way, and any known printing method such as the screen printing method, intaglio printing method, relief printing method, calendar roll method, etc., may be applied. Screen printing is the most general way to produce thin, highly laminated multilayer devices, while it may be better to apply inkjet printing if very fine electrode patterns or special shapes are required.

According to an embodiment of the present invention, both electrode layers 1b and 2b may have the exact same composition. In this case, the battery is polar-symmetrical, and thus polarity need not be of concern when it is mounted.

Any known art may be referenced as deemed appropriate for the manufacturing of a multilayer body. Typically, respective precursors (green sheets, etc.) of a pair of electrode layers and solid-state electrolyte layer are stacked together, while layers printed with a conductive metal paste are formed as current collector precursors, and the foregoing are compressed by means of any of the various methods to obtain, and then sinter, a multilayer body (precursor of a multilayer part). Examples of sintering conditions include, but are not limited to, oxidizing ambience or non-oxidizing ambience at a highest temperature of preferably 400° C. to 1000° C., or more preferably 500° C. to 900° C., among others. A step to hold the multilayer body in oxidizing ambience at a temperature lower than the highest temperature may be provided, in order to fully remove the binder before the highest temperature is reached. Desirably sintering is performed at the lowest possible temperature to reduce the process cost. Re-oxidization may be performed after the sintering. The all-solid-state battery proposed by the present invention is thus obtained.

Figure 2A:
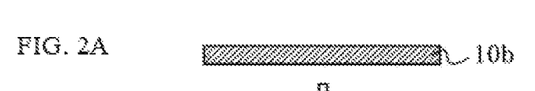
FIGS. 2A to 2E are schematic cross-sectional views of an example of manufacturing of a laminate.
Figure 2B:
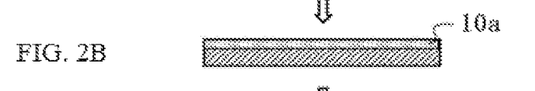
Figure 2C:
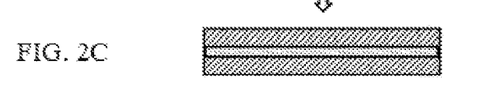
Figure 2D:
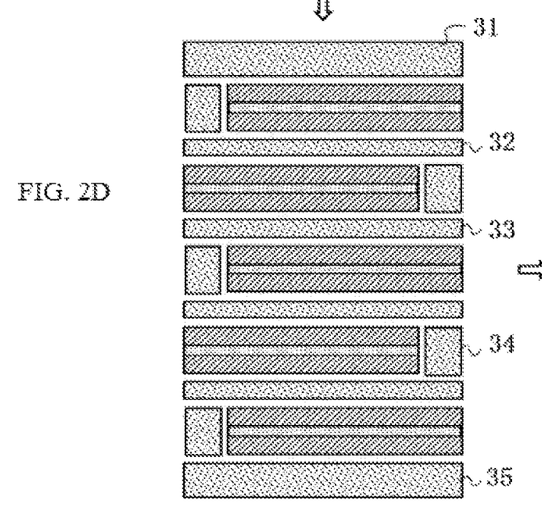
Figure 2E:
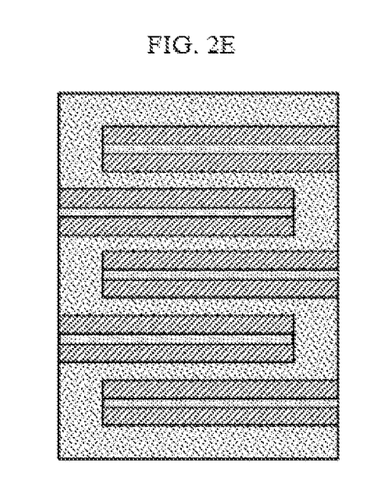

FIGS. 2A to 2E provide schematic cross-sectional views showing an example of manufacturing of a multilayer body. As shown in FIG. 2A, an electrode layer precursor 10b is prepared, and as shown in FIG. 2B, a layer printed with a conductive metal paste is formed as a current collector precursor 10a on one side of the electrode layer precursor 10b, and as shown in FIG. 2C, the current collector precursor 10a is sandwiched by two layers of the electrode layer precursor 10b, to prepare a multilayer structure. Next, multiple multilayer bodies as shown in FIG. 2C are prepared and stacked together. At this time, as shown in FIG. 2D, precursors 31 to 35 of solid-state electrolyte layers may be placed as deemed appropriate. Thereafter, the entirety of the layers is compressed to obtain a multilayer body as shown in FIG. 2E. The obtained multilayer body may be sintered as described above and cut as necessary.

EXAMPLES

The present invention is explained specifically below using examples. It should be noted that the present invention is not limited to the embodiments according to these examples.

First, various types of solid-state electrolytes were evaluated by manufacturing all-solid-state half-cells.

Manufacturing Example 1

A solid-state electrolyte layer with the composition $Li_xA_yCo_zM'_aM''_bP_3O_c$ was manufactured as described below.

M' is Al, while M'' is Ge. The values of x to z and a to c above in the solid-state electrolyte in the vicinity of the positive electrode are shown in Table 1. Based on XRD measurement, this sintered body had a primary phase having a NASICON-type crystalline structure and secondary phases having crystalline structures different from the primary phase, and when calculated from the respective diffraction peak intensities, the secondary phase intensity ratio $I_{sub}/(I_{main} I_{sub})$ was 7%. For the secondary phases, $GeO_2$ and $LiCoPO_4$ were recognized. When a cross-section of the sintered body was observed with a SEM and also analyzed with EDS element analysis, the largest particle diameter in the secondary phases was 2.8 μm. In producing each all-solid-state half-cell, a 50-nm thick Au electrode was formed by means of sputtering on one side of a sintered body of solid-state electrolyte of 14.5 mm in diameter and 350 μm in thickness (sintered body density: 3.3 g·cm³ or more), while a metal lithium foil was placed on the opposite side over a polymer electrolyte, and this constitution was sealed in a 2032-type coin cell inside an argon glovebox. Voltage of 4.5 VDC vs $Li/Li^+$ was applied for 2 hours, and based on the amount of current that flowed, the level of Li extraction amount was estimated. The result is shown in Table 1.

The particle diameter in the secondary phases was measured using observation images (reflective electron images) taken with a scanning electron microscope (SEM). To be specific, 10 reflective electron images were captured at randomly selected locations at a 2000× magnification. Next, the Feret diameter of each particle was obtained as a means for particle diameter measurement. To be specific, the average length of a total of four sides, including two sides of a rectangle circumscribing the particle image, and the two sides of a circumscribing rectangle drawn at a 45-degree angle, was used as the particle diameter of the observed particle. According to this method, the largest particle diameter was identified on each image, and the average of 10 largest diameters was calculated.

In the aforementioned XRD analysis, phases were attributed with CuKα as an X-ray source by referring to each of the following data from the collection of powder X-ray diffraction pattern data provided by The International Centre for Diffraction Data.

Primary phase, NASICON-type ($LiGe_2P_3O_{12}$):
PDF #98-001-7194, main diffraction peak positioned near 25.1°
Secondary phase $GeO_2$:
PDF #04-010-4456, main diffraction peak positioned near 25.9°
Secondary phase $LiCoPO_4$:
PDF #00-032-0552, main diffraction peak positioned near 35.9°
Secondary phase $AlPO_4$:
PDF #04-015-7504, main diffraction peak positioned near 21.8°

Manufacturing Example 2

An evaluation was performed in the same manner as in Manufacturing Example 1, except that the values of x to z and a to c in the composition formula were changed as shown in Table 1. When calculated based on XRD measurement of the sintered body of solid-state electrolyte, $I_{sub}/(I_{main}+I_{sub})$ was 8%. $GeO_2$ and $LiCoPO_4$ were found as secondary phases, and the largest particle diameter of the secondary phases was 3.4 µm.

Manufacturing Example 3

An evaluation was performed in the same manner as in Manufacturing Example 1, except that the values of x to z and a to c in the composition formula were changed as shown in Table 1. When calculated based on XRD measurement of the sintered body of solid-state electrolyte, $I_{sub}/(I_{main}+I_{sub})$ was 13%. $GeO_2$ and $LiCoPO_4$ were found as secondary phases, and the largest particle diameter of the secondary phases was 2.5 µm.

Manufacturing Example 4

An evaluation was performed in the same manner as in Manufacturing Example 1, except that the values of x to z and a to c in the composition formula were changed as shown in Table 1. When calculated based on XRD measurement of the sintered body of solid-state electrolyte, $I_{sub}/(I_{main}+I_{sub})$ was 15%. $GeO_2$, $LiCoPO_4$, and $AlPO_4$ were found as secondary phases, and the largest particle diameter of the secondary phases was 3.9 µm.

Manufacturing Example 5

An evaluation was performed in the same manner as in Manufacturing Example 1, except that the values of x to z and a to c in the composition formula were changed as shown in Table 1. It should be noted that A in the composition formula is Mg. When calculated based on XRD measurement of the sintered body of solid-state electrolyte, $I_{sub}/(I_{main}\ I_{sub})$ was 11%. $GeO_2$ and $LiCoPO_4$ were found as secondary phases, and the largest particle diameter of the secondary phases was 2.2 µm.

Manufacturing Example 6

An evaluation was performed in the same manner as in Manufacturing Example 5, except that the values of x to z and a to c in the composition formula were changed as shown in Table 1. When calculated based on XRD measurement of the sintered body of solid-state electrolyte, $I_{sub}/(I_{main}+I_{sub})$ was 15%. $GeO_2$ and $LiCoPO_4$ were found as secondary phases, and the largest particle diameter of the secondary phases was 3.0 µm.

Manufacturing Example 7

An evaluation was performed in the same manner as in Manufacturing Example 5, except that the values of x to z and a to c in the composition formula were changed as shown in Table 1. When calculated based on XRD measurement of the sintered body of solid-state electrolyte, $I_{sub}/(I_{main}+I_{sub})$ was 25%. $GeO_2$ and $LiCoPO_4$ were found as secondary phases, and the largest particle diameter of the secondary phases was 3.4 µm.

Manufacturing Example 8

An evaluation was performed in the same manner as in Manufacturing Example 1, except that the values of x to z and a to c in the composition formula were changed as shown in Table 1. This composition gives x+2y+2z=1.7, which does not satisfy the condition "1.8≤x+2y+2z≤2.8." When calculated based on XRD measurement of the sintered body of solid-state electrolyte, $I_{sub}/(I_{main}\ I_{sub})$ was 19%. $GeO_2$ and $LiCoPO_4$ were found as secondary phases, and the largest particle diameter of the secondary phases was 2.4 µm.

Manufacturing Example 9

An evaluation was performed in the same manner as in Manufacturing Example 1, except that the values of x to z and a to c in the composition formula were changed as shown in Table 1. This composition does not satisfy the condition "9−3a−4b≤x+2y+2z." When calculated based on XRD measurement of the sintered body of solid-state electrolyte, $I_{sub}/(I_{main}\ I_{sub})$ was 12%. $LiCoPO_4$ and $AlPO_4$ were found as secondary phases, and the largest particle diameter of the secondary phases was 3.3 µm.

Manufacturing Example 10

An evaluation was performed in the same manner as in Manufacturing Example 5, except that the values of x to z and a to c in the composition formula were changed as shown in Table 1. This composition does not satisfy the condition "9−3a−4b≤x+2y+2z." When calculated based on XRD measurement of the sintered body of solid-state electrolyte, $I_{sub}/(I_{main}\ I_{sub})$ was 11%. $LiCoPO_4$ and $AlPO_4$ were found as secondary phases, and the largest particle diameter of the secondary phases was 4.1 µm.

Manufacturing Example 11

An evaluation was performed in the same manner as in Manufacturing Example 5, except that the values of x to z and a to c in the composition formula were changed as shown in Table 1. This composition does not satisfy the condition "9−3a−4b≤x+2y+2z." When calculated based on XRD measurement of the sintered body of solid-state electrolyte, $I_{sub}/(I_{main}\ I_{sub})$ was 12%. $LiCoPO_4$ and $AlPO_4$ were found as secondary phases, and the largest particle diameter of the secondary phases was 3.4 µm.

TABLE 1

| | x | y | z | a | b | c | 9 − 3a − 4b | Symbol | x + 2y + 2z (1.8~2.8) | Current capacity when 4.5 V is applied μAh |
|---|---|---|---|---|---|---|---|---|---|---|
| Manufacturing Example 1 | 1.5 | 0 | 0.4 | 0.5 | 1.3 | 12.1 | 2.3 | = | 2.3 | 2.7 |
| Manufacturing Example 2 | 1.3 | 0 | 0.4 | 0.3 | 1.5 | 12.1 | 2.1 | = | 2.1 | 3.0 |
| Manufacturing Example 3 | 1.5 | 0 | 0.4 | 0.3 | 1.5 | 12.2 | 2.1 | < | 2.3 | 1.7 |
| Manufacturing Example 4 | 1.5 | 0 | 0.4 | 0.5 | 1.5 | 12.5 | 1.5 | < | 2.3 | 3.7 |
| Manufacturing Example 5 | 1.5 | 0.15 | 0.2 | 0.5 | 1.5 | 12.4 | 1.5 | < | 2.2 | 4.2 |
| Manufacturing Example 6 | 1.5 | 0.15 | 0.2 | 0.3 | 1.5 | 12.1 | 2.1 | < | 2.2 | 3.2 |
| Manufacturing Example 7 | 1.5 | 0.15 | 0.4 | 0.7 | 1.7 | 13.4 | 0.1 | < | 2.6 | 6.2 |
| Manufacturing Example 8 | 1.3 | 0 | 0.2 | 0.3 | 1.7 | 12.3 | 1.3 | < | 1.7 | 25.3 |
| Manufacturing Example 9 | 1.5 | 0 | 0.4 | 0.3 | 1.3 | 11.8 | 2.9 | > | 2.3 | 32.3 |
| Manufacturing Example 10 | 1.5 | 0.15 | 0.2 | 0.5 | 1.3 | 12.0 | 2.3 | > | 2.2 | 11.1 |
| Manufacturing Example 11 | 1.5 | 0.15 | 0.2 | 0.3 | 1.3 | 11.7 | 2.9 | > | 2.2 | 28.8 |

Several of the solid-state electrolyte layers evaluated above, were evaluated by manufacturing all-solid-state batteries. It is demonstrated, as understood from the following examples and comparative examples, that the trend of current capacity exhibited by the aforementioned all-solid-state half-cells is also reflected in the all-solid-state batteries.

Example 1

Figure 3:
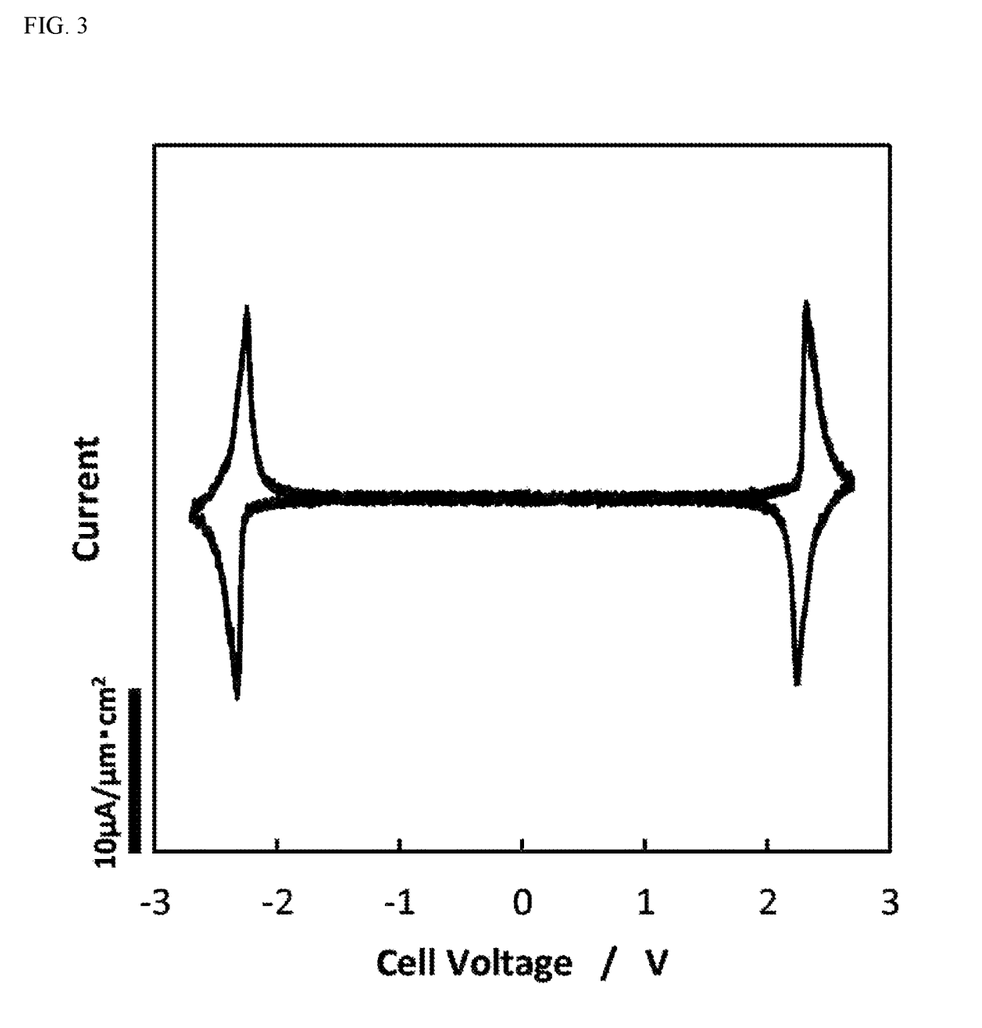
FIG. 3 is a cyclic voltammogram pertaining to an example.

For the solid-state electrolyte layer, the same solid-state electrolyte layer used in Manufacturing Example 1 was used for the entire area of the solid-state electrolyte layer. As a solid-state electrolyte to be contained in both of the electrode layers, a solid-state electrolyte with the same composition as in Manufacturing Example 1, except that Ge was changed to Ti, was produced separately. For both of the positive electrode and the negative electrode, an electrode layer constituted by three types of composites including a conductive auxiliary Pd, the aforementioned solid-state electrolyte (also used as a negative-electrode active material), and LiCoPO$_4$ having an olivine-type crystalline structure as a positive-electrode active material, was produced. These were used to produce a symmetrical all-solid-state battery. When two cycles of cyclic voltammetry was performed at 80° C., in a range of −2.7 V to 2.7 V, and at 0.1 mV/sec, good cycle characteristics were exhibited, with little secondary reaction manifesting in a range of −2 V to 2 V as shown in FIG. 3.

Example 2

Of the solid-state electrolyte layer in Example 1, areas within 10 μm in the vicinity of the top and bottom electrode layers had the same composition as in Example 1. For the composition of areas over 330 μm inside the solid-state electrolyte layer, a composition identical to the composition of the solid-state electrolyte layer in Manufacturing Example 1, except that Ge was changed to Ti, was used to produce a separate solid-state electrolyte. An electrode layer was produced in the same manner as in Example 1. When the obtained symmetrical all-solid-state battery was measured in the same manner, good cycle characteristics with suppressed secondary reaction were exhibited.

Comparative Example 1

Figure 4:
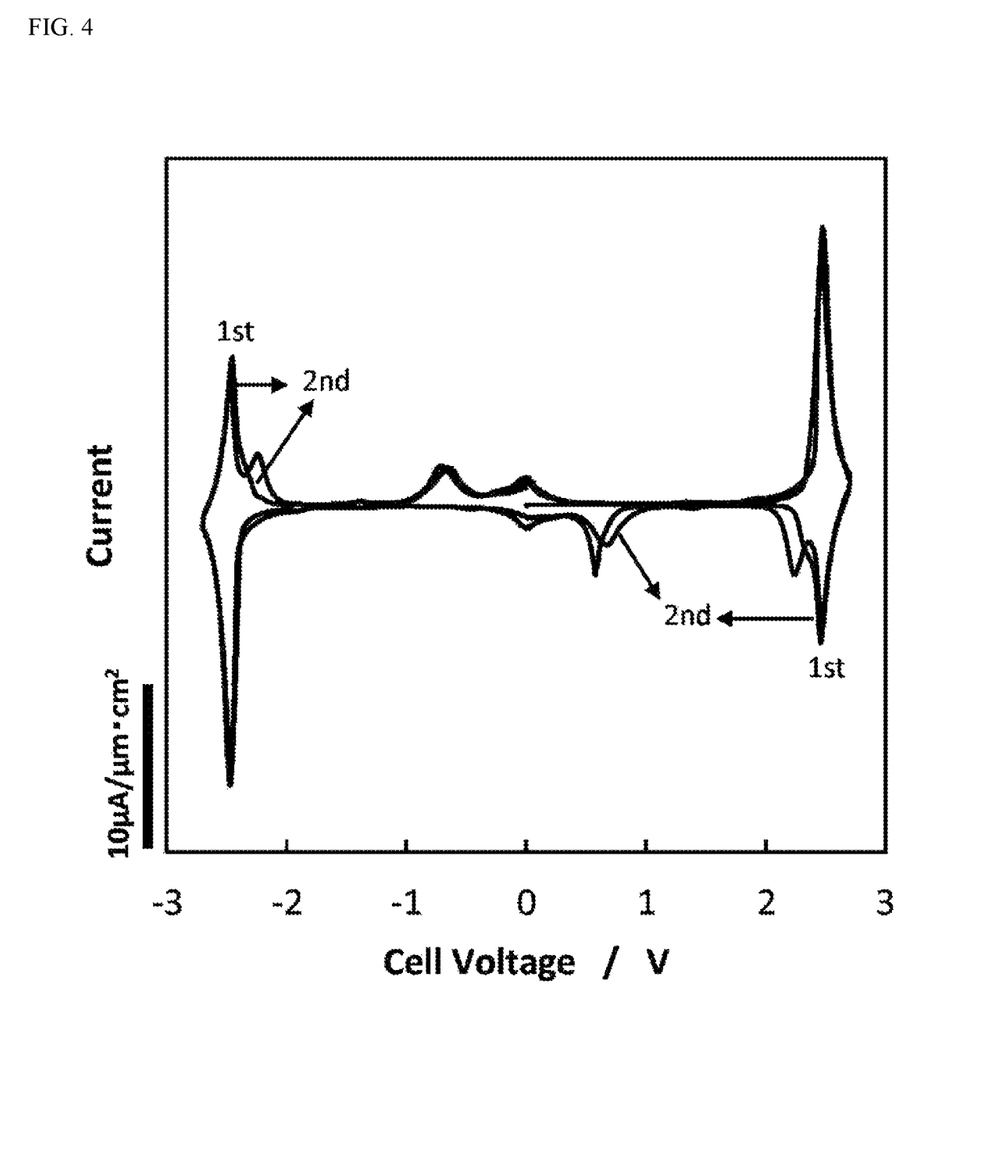
FIG. 4 is a cyclic voltammogram pertaining to a comparative example.

An all-solid-state battery was produced and measured in the same manner as in Example 1, except that the solid-state electrolyte in Manufacturing Example 8 was used for a solid-state electrolyte in a solid-state electrolyte layer and also for a solid-state electrolyte to be contained in electrode layers. As shown in FIG. 4, secondary reaction peaks were found in a range of −2 V to 2 V, and also cycle characteristics were not good (see the "1$^{st}$" cycle and the "2$^{nd}$" cycle).

In the present disclosure where conditions and/or structures are not specified, a skilled artisan in the art can readily provide such conditions and/or structures, in view of the present disclosure, as a matter of routine experimentation. Also, in the present disclosure including the examples described above, any ranges applied in some embodiments may include or exclude the lower and/or upper endpoints, and any values of variables indicated may refer to precise values or approximate values and include equivalents, and may refer to average, median, representative, majority, etc. in some embodiments. Further, in this disclosure, "a" may refer to a species or a genus including multiple species, and "the invention" or "the present invention" may refer to at least one of the embodiments or aspects explicitly, necessarily, or inherently disclosed herein. The terms "constituted by" and "having" refer independently to "typically or broadly comprising", "comprising", "consisting essentially of", or "consisting of" in some embodiments. In this disclosure, any defined meanings do not necessarily exclude ordinary and customary meanings in some embodiments.

The present application claims priority to Japanese Patent Application No. 2016-209947, filed Oct. 26, 2016, the disclosure of which is incorporated herein by reference in its entirety including any and all particular combinations of the features disclosed therein.

It will be understood by those of skill in the art that numerous and various modifications can be made without departing from the spirit of the present invention. Therefore, it should be clearly understood that the forms of the present invention are illustrative only and are not intended to limit the scope of the present invention.

We claim:
1. An all-solid-state battery constituted by a sintered multilayer body comprising:
a pair of electrode layers consisting of first and second electrode layers, and a solid-state electrolyte layer positioned between the pair of electrode layers;
wherein:
the first electrode layer contains an electrode active material having an olivine-type crystalline structure;
the solid-state electrolyte layer contains a solid-state electrolyte having a NASICON-type crystalline structure which constitutes a primary phase throughout an entire portion of the solid-state electrolyte layer;
a composition of the solid-state electrolyte layer in a vicinity of the first electrode layer is expressed as a whole by formula (1):

$$\mathrm{Li}_x \mathrm{A}_y \mathrm{CO}_z \mathrm{M'}_a \mathrm{M''}_b \mathrm{P}_3 \mathrm{O}_c \quad (1)$$

wherein $1.0 \le x \le 2.0$; $0 \le y \le 0.4$; $0.05 \le z \le 0.8$; $0.2 \le a \le 0.7$; $1.3 \le b \le 1.7$; $12.0 \le c \le 13.5$; $9-3a-4b \le x+2y+2z$; $1.8 \le x+2y+2z \le 2.8$; A represents at least one bivalent metal element selected from the group consisting of Mg, Ca, and Ni; M' is at least one trivalent metal element selected from the group consisting of Al, Y, and Ga; and M" is a 1st M" which is Ge; and the vicinity of the first electrode layer refers to an area within 5 μm from an interface between the solid-state electrolyte layer and the first electrode layer wherein a thickness of the solid-state electrolyte layer exceeds 5 μm;
a composition of the solid-state electrolyte layer in a non-vicinity area other than the vicinity is expressed as a whole by formula (1) except that M" is a 2nd M" which is Ti; and
the first electrode layer contains a solid-state electrolyte which is expressed as a whole by formula (1) except that M" is the 2nd M".

2. The all-solid-state battery according to claim 1, wherein $0 < y \le 0.4$, and A as mentioned above is Mg.

3. The all-solid-state battery according to claim 2, wherein the electrode active material of the second electrode layer, having an olivine-type crystalline structure, is LiCoPO$_4$.

4. The all-solid-state battery according to claim 2, wherein the solid-state electrolyte layer at least in the vicinity of the first electrode layer is constituted by a primary phase having a NASICON-type crystalline structure and secondary phases of crystalline structures different from that of the primary phase, and a ratio of X-ray diffraction peak intensities $I_{sub}/(I_{main}+I_{sub})$ is 2 to 40%, where $I_{sub}$ indicates the total sum of the main diffraction peak intensities of the respective secondary phases, while $I_{main}$ indicates the main diffraction peak intensity of the primary phase.

5. The all-solid-state battery according to claim 2, wherein both of the first and second electrode layers have an electrode active material having an olivine-type crystalline structure, wherein a composition of the solid-state electrolyte layer at least in a vicinity of the second electrode layer is expressed as a whole by $\mathrm{Li}_x \mathrm{A}_y \mathrm{Co}_z \mathrm{M'}_a \mathrm{M''}_b \mathrm{P}_3 \mathrm{O}_c$ wherein x, y, z, a, b, c, A, M' and M" are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

6. The all-solid-state battery according to claim 5, wherein both of the first and second electrode layers contain a common electrode active material.

7. The all-solid-state battery according to claim 1, wherein the electrode active material of the second electrode layer, having an olivine-type crystalline structure, is LiCoPO$_4$.

8. The all-solid-state battery according to claim 7, wherein the solid-state electrolyte layer at least in the vicinity of the first electrode layer is constituted by a primary phase having a NASICON-type crystalline structure and secondary phases of crystalline structures different from that of the primary phase, and a ratio of X-ray diffraction peak intensities $I_{sub}/(I_{main}+I_{sub})$ is 2 to 40%, where $I_{sub}$ indicates the total sum of the main diffraction peak intensities of the respective secondary phases, while $I_{main}$ indicates the main diffraction peak intensity of the primary phase.

9. The all-solid-state battery according to claim 7, wherein both of the first and second electrode layers have an electrode active material having an olivine-type crystalline structure, wherein a composition of the solid-state electrolyte layer at least in a vicinity of the second electrode layer is expressed as a whole by $\mathrm{Li}_x \mathrm{A}_y \mathrm{Co}_z \mathrm{M'}_a \mathrm{M''}_b \mathrm{P}_3 \mathrm{O}_c$ wherein x, y, z, a, b, c, A, M' and M" are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

10. The all-solid-state battery according to claim 9, wherein both of the first and second electrode layers contain a common electrode active material.

11. The all-solid-state battery according to claim 1, wherein the solid-state electrolyte layer at least in the vicinity of the first electrode layer is constituted by a primary phase having a NASICON-type crystalline structure and secondary phases of crystalline structures different from that of the primary phase, and a ratio of X-ray diffraction peak intensities $I_{sub}/(I_{main}+I_{sub})$ is 2 to 40%, where $I_{sub}$ indicates the total sum of the main diffraction peak intensities of the respective secondary phases, while $I_{main}$ indicates the main diffraction peak intensity of the primary phase.

12. The all-solid-state battery according to claim 11, wherein the secondary phases contain segregated particles and the largest segregated particle diameter is 5 μm or less.

13. The all-solid-state battery according to claim 12, wherein both of the first and second electrode layers have an electrode active material having an olivine-type crystalline structure, wherein a composition of the solid-state electrolyte layer at least in a vicinity of the second electrode layer is expressed as a whole by $\mathrm{Li}_x \mathrm{A}_y \mathrm{Co}_z \mathrm{M'}_a \mathrm{M''}_b \mathrm{P}_3 \mathrm{O}_c$ wherein x, y, z, a, b, c, A, M' and M" are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

14. The all-solid-state battery according to claim 11, wherein the secondary phase is at least one type selected from the group that includes GeO$_2$, A$_1$PO$_4$, and LiCoPO$_4$.

15. The all-solid-state battery according to claim 14, wherein both of the first and second electrode layers have an electrode active material having an olivine-type crystalline structure, wherein a composition of the solid-state electrolyte layer at least in a vicinity of the second electrode layer is expressed as a whole by $Li_xA_yCo_zM'_aM''_bP_3O_c$ wherein x, y, z, a, b, c, A, M' and M'' are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

16. The all-solid-state battery according to claim 11, wherein both of the first and second electrode layers have an electrode active material having an olivine-type crystalline structure, wherein a composition of the solid-state electrolyte layer at least in a vicinity of the second electrode layer is expressed as a whole by $Li_xA_yCo_zM'_aM''_bP_3O_c$ wherein x, y, z, a, b, c, A, M' and M'' are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

17. The all-solid-state battery according to claim 16, wherein both of the first and second electrode layers contain a common electrode active material.

18. The all-solid-state battery according to claim 1, wherein both of the first and second electrode layers have an electrode active material having an olivine-type crystalline structure, wherein a composition of the solid-state electrolyte layer at least in a vicinity of the second electrode layer is expressed as a whole by $Li_xA_yCo_zM'_aM''_bP_3O_c$ wherein x, y, z, a, b, c, A, M' and M'' are the same as those defined in composition formula (1), and the vicinity of the second electrode layer refers to (A') an area within 5 μm from an interface between the solid-state electrolyte layer and the second electrode layer when a thickness of the solid-state electrolyte layer exceeds 5 μm, or (B') the entire solid-state electrolyte layer when the thickness of the solid-state electrolyte layer is 5 μm or less.

19. The all-solid-state battery according to claim 18, wherein both of the first and second electrode layers contain a common electrode active material.

* * * * *

UNITED STATES PATENT AND TRADEMARK OFFICE
CERTIFICATE OF CORRECTION

| | |
|---|---|
| PATENT NO. | : 11,588,172 B2 |
| APPLICATION NO. | : 15/792737 |
| DATED | : February 21, 2023 |
| INVENTOR(S) | : Daigo Ito et al. |

It is certified that error appears in the above-identified patent and that said Letters Patent is hereby corrected as shown below:

In the Claims

Column 13, Line 24, Claim 1, delete a space between "9-3a-4b" and "x+2y+2z", and insert therefor --$\leq$--

Signed and Sealed this
Eighteenth Day of April, 2023

Katherine Kelly Vidal
*Director of the United States Patent and Trademark Office*